US008048551B2

(12) United States Patent
Cho et al.

(10) Patent No.: US 8,048,551 B2
(45) Date of Patent: Nov. 1, 2011

(54) BATTERY SAFETY DEVICE AND BATTERY HAVING THE SAME

(75) Inventors: Jeong Ju Cho, Daejeon (KR); Sung Kyun Chang, Daejeon (KR); Min Chul Jang, Daejeon (KR); Jae Hyun Lee, Daejeon (KR); Joon Hwan Lee, Daejeon (KR); Soo Hyun Ha, Busan (KR)

(73) Assignee: LG Chem, Ltd. (KR)

( * ) Notice: Subject to any disclaimer, the term of this patent is extended or adjusted under 35 U.S.C. 154(b) by 401 days.

(21) Appl. No.: 11/107,685

(22) Filed: Apr. 15, 2005

(65) Prior Publication Data

US 2005/0255376 A1 Nov. 17, 2005

(30) Foreign Application Priority Data

Apr. 16, 2004 (KR) .................. 10-2004-0026242
Mar. 18, 2005 (KR) .................. 10-2005-0022715

(51) Int. Cl.
*H01M 2/00* (2006.01)
*H01M 6/00* (2006.01)
*H01M 10/00* (2006.01)
*H01H 35/00* (2006.01)

(52) U.S. Cl. ............ 429/61; 429/121; 429/122; 307/119

(58) Field of Classification Search .................. 429/120, 429/122, 178–180, 234–245, 61, 121; 29/623.1–623.5; 338/99–101, 114–115; 307/119; 252/502, 510–511
See application file for complete search history.

(56) References Cited

U.S. PATENT DOCUMENTS

| 4,745,301 A | * | 5/1988 | Michalchik | .................. 307/119 |
| 5,585,207 A | * | 12/1996 | Wakabe et al. | ............... 429/178 |
| 5,747,188 A | | 5/1998 | Von Sacken et al. | |
| 6,051,341 A | * | 4/2000 | Terasaki | ........................ 429/234 |
| 6,471,816 B1 | | 10/2002 | Shuto et al. | ................... 156/256 |
| 6,531,951 B2 | * | 3/2003 | Serban et al. | ................... 338/47 |
| 2003/0013005 A1 | | 1/2003 | Chang | ............................. 429/53 |

(Continued)

FOREIGN PATENT DOCUMENTS

JP 11-007932 1/1999

(Continued)

OTHER PUBLICATIONS

PCT International Search Report for Application No. PCT/KR2005/001061; Date of Mailing : Jul. 27, 2005 (All references cited in Search Report are listed above).

(Continued)

*Primary Examiner* — Barbara Gilliam
*Assistant Examiner* — Claire L Roe
(74) *Attorney, Agent, or Firm* — Cantor Colburn LLP

(57) ABSTRACT

Disclosed is a battery safety device having a first metal plate, a second metal plate, and a pressure-sensitive conducting film interposed between both metal plates and adapted to exhibit electrical conductivity when a predetermined pressure or higher is applied. The first and second metal plates are electrically connected to the positive and negative electrodes of the battery, respectively. The safety device connected to a battery prevents the battery from being damaged or at least from igniting or exploding, even when an external impact caused by pressure, a nail, or a nipper or an external pressure is applied to the battery, by conducting the current of the battery to the safety device and discharging the battery before the battery is damaged by the external impact or external pressure.

14 Claims, 4 Drawing Sheets

U.S. PATENT DOCUMENTS

2003/0027036 A1    2/2003   Emori et al. .................... 429/61

FOREIGN PATENT DOCUMENTS

| | | |
|---|---|---|
| JP | 1999-191436 | 7/1999 |
| JP | 2001-210308 | 8/2001 |
| JP | 2004-303447 A | 10/2004 |
| JP | 2004-319463 A | 11/2004 |
| JP | 2006-185707 A | 7/2006 |
| SU | 735554 C1 | 5/1976 |

OTHER PUBLICATIONS

Notice of Allowance issued on Sep. 28, 2007 by the Russian Patent Office for corresponding Russian Patent Application No. 2006140372 (English translation).

European Search Report dated Oct. 7, 2008 for Application No. 05764911.3-2119. All References cited in Search report listed in Information Disclosure Statement.

* cited by examiner

BATTERY SAFETY DEVICE AND BATTERY HAVING THE SAME

BACKGROUND OF THE INVENTION

1. Field of the Invention

The present invention relates to a battery safety device adapted to form an electrical circuit and convert a charged state of the battery to a discharged state when compressed by a predetermined pressure or higher. Also, the present invention relates to a battery having the safety device.

2. Description of the Related Art

As recent electronic appliances rapidly become wireless and portable, a non-aqueous electrolyte secondary battery having large capacity and high energy density has been developed as their driving power source. However, such a non-aqueous electrolyte secondary battery is exposed to danger in that, when a strong external pressure or an external impact caused by a nail or nipper is applied, the interior of the cell is damaged and the cell may ignite or explode.

In particular, since the positive electrode active material is sensitive to voltage, the reactivity between the positive electrode and the electrolyte increases as the battery is charged and the voltage rises. The surface of the positive electrode then decomposes and oxidation reaction occurs to the electrolyte. This increases the danger of fire or explosion.

Such a safety problem becomes more important as the battery, specifically the non-aqueous electrolyte secondary battery (for example, lithium secondary battery), has larger capacity and higher energy density.

SUMMARY OF THE INVENTION

The present invention is directed to that substantially obviates one or more problems due to limitations and disadvantages of the related art.

It is an object of the present invention to provide a method for lowering the charged state of a cell before it is damaged by an external impact caused by a pressure, a nail or a nipper by positioning a safety device inside or outside the cell so that the battery is safe from the external impact.

To achieve this object and other advantages in accordance with the purpose of the invention, as embodied and broadly described herein, there is provided a battery having a safety device adapted to form an electrical circuit when compressed by a predetermined pressure or higher and convert the charged state of the battery to the discharged state.

According to another aspect of the present invention, there is provided a safety device for a battery, which is adapted to form an electrical circuit when compressed by a predetermined pressure or higher and convert the charged state of the battery to the discharged state.

According to still another aspect of the present invention, there is provided a method for adjusting the safety of a battery by converting the charged state of the battery to the discharged state, before the battery is damaged by a pressure, through an electrical circuit formed on a safety device by means of the pressure.

Preferably, the safety device includes a first metal plate, a second metal plate, and a PSCF (pressure-sensitive conducting film) interposed between both metal plates and adapted to exhibit electrical conductivity when a predetermined pressure or higher is applied. The first and second metal plates are electrically connected to the positive and negative electrodes of the battery, respectively.

Additional advantages, objects, and features of the invention will be set forth in part in the description which follows and in part will become apparent to those having ordinary skill in the art upon examination of the following or may be learned by practicing the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings.

Hereinafter, according to the present invention will be explained with reference to the accompanying drawings.

The present invention is characterized in that in order to lower the charged state of a cell by sensing the application of an external impact caused by a pressure, a nail, or a nipper or an external pressure to a battery, a battery is provided with a safety device adapted to exhibit electrical conductivity in the case of an external impact or external compression.

Figure 1:
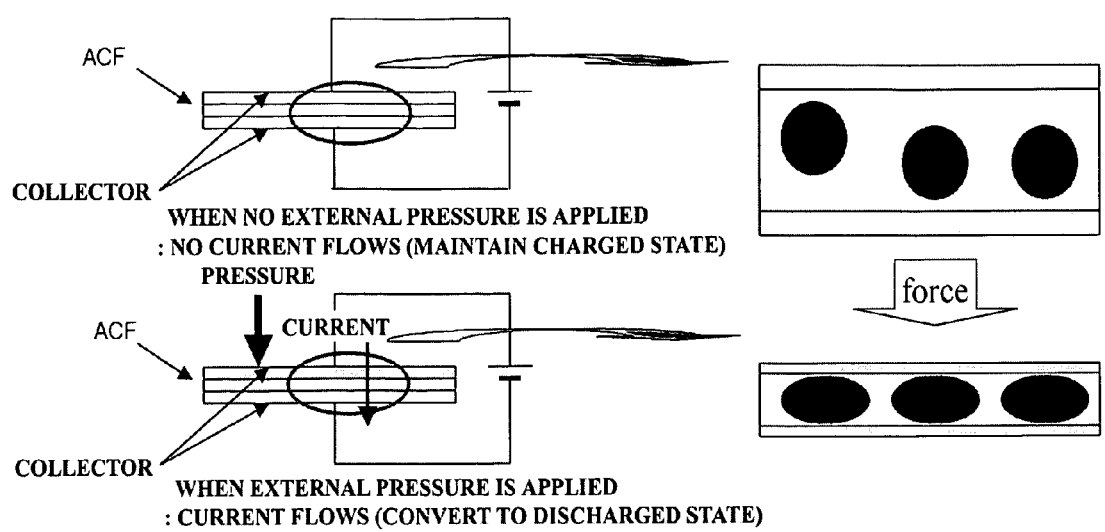
FIG. 1 is a diagrammatic view showing the operating principle of an ACF safety device according to the present invention.

As a non-limiting example of a safety device for exhibiting electrical conductivity in the case of an external impact or external compression, the present invention provides a safety device having a PSCF interposed between two metal plates (for example, collectors) through which current can flow and adapted to conduct current, when a predetermined pressure or higher occurs, in the direction of the pressure (refer to FIG. 1).

As a non-limiting example of the PSCF, an ACF (anisotropic conductive film) is provided.

The ACF refers to an adhesive film including an insulating adhesive having a thickness of 15-35 μm and electrically conductive balls composed of fine electrically conductive particles having a diameter of 3-15 μm dispersed therein. The idea of the present invention is not limited by the thickness of the adhesive film and the diameter of the electrically conductive particles constituting the ACF. The electrically conductive particles include carbon fibers, metal (Ni, solder), and metal (Ni/Au)-coated plastic balls. This is just an illustration of the embodiments of the present invention and is not a general term for the PSCF. It is obvious to those skilled in the art that any PSCF can be applied to the principle of the present invention.

The adhesive material includes thermoplastic material (styrene butadiene rubber, polyvinyl butylene), thermosetting material (epoxy resin, polyurethane, acrylic resin), and a mixture of thermoplastic material and thermosetting material.

The metal plate used in the present invention may be made of any metal having electrical conductivity, such as aluminum metal, copper metal, and nickel metal.

The metal plate preferably has excellent thermal conductivity so that, in a normal or special situation, heat can be dispersed from inside the battery to the thermally conductive metal plate via a terminal.

The operation of a battery having a safety device adapted to exhibit electrical conductivity when a predetermined pressure or higher is applied in the case of an external impact or external compression according to the present invention will now be described with reference to the drawings.

The safety device according to the present invention includes a first metal plate, a second metal plate, and a PSCF interposed between both metal plates and adapted to exhibit electrical conductivity when a predetermined pressure or higher is applied. An example of the safety device, as shown in FIG. 1, includes collectors acting as the metal plates and an ACF acting as the PSCF.

The ACF acts as a nonconductor through which no current is allowed to flow during a normal state and, when a predetermined pressure or higher occurs, conducts current in the direction of the pressure.

As shown in FIG. 1, the first metal plate (collector) of both metal plates positioned on both surfaces of the ACF is electrically connected to the positive electrode of the battery and the second metal plate (collector) to the negative electrode thereof.

In the battery having the inventive safety device connected thereto, both metal plates are electrically insulated from each other by the ACF, as long as no external pressure is applied to them, and no current flows between them. The battery then functions normally and maintains the charged state.

When a pressure caused by an external impact and the like is applied to the battery having the inventive safety device connected thereto, both metal plates are electrically connected to each other. This is because the ACF exhibits electrical conductivity when the pressure reaches a predetermined level. The battery is then discharged and the internal voltage of the battery drops abruptly. In the discharged state, the battery does not ignite nor explode even when an impact caused by an external pressure, a nail, or a nipper is applied thereto. As such, the present invention can improve the safety of the battery by lowering the charged state of the cell before it explodes, when a predetermined pressure or higher is applied to the metal plates due to an external impact cause by a pressure, a nail, or a nipper.

The safety device is positioned along a long side of the battery such that the inventive safety device is preferably positioned perpendicularly to a direction in which most pressure is applied to the battery in the case of an external impact or external compression.

The inventive safety device may be positioned inside or outside the cell, but is preferably positioned outside.

When positioned outside the battery, the inventive safety device may be used while being exposed or while being enclosed by a polymer layer having electrical insulation property.

Figure 2:
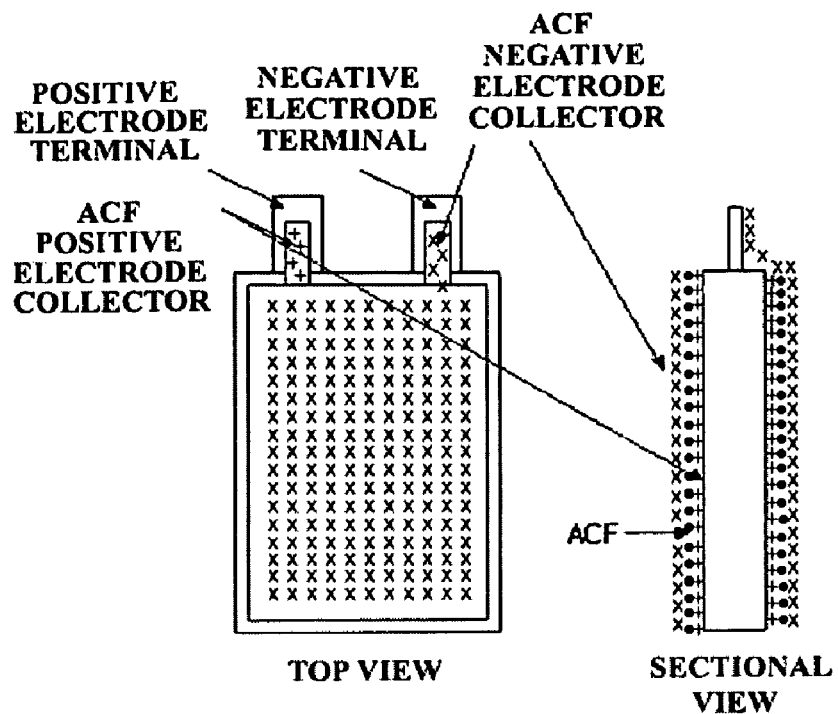
FIG. 2 is a diagrammatic view showing a pouch-type battery having an ACF safety device electrically connected thereto according to the present invention.

Meanwhile, examples of connection of the safety device according to the present invention to a battery are illustrated FIG. 2.

FIG. 2 shows a pouch-type battery having the inventive safety device connected thereto.

In general, a pouch-type battery is of a lamination type and includes at least one positive electrode plate and at least one negative electrode plate which are laminated alternately. The lamination-type battery has positive and negative electrode leads for connecting the positive and negative electrode plates to the exterior of the battery, respectively. The leads are connected to a power source on the exterior of the battery sheath.

The inventive safety device including the first and second metal plates and the ACF interposed between them are laminated together with the outermost positive electrode plate and/or the outermost negative electrode plate. The first metal plate is electrically connected to a part of the positive electrode plate, to the positive electrode lead, or to the positive electrode terminal and the second metal plate is electrically connected to a part of the negative electrode plate, to the negative electrode lead, or to the negative electrode terminal.

The inventive safety device may be laminated directly adjacent to the electrode plate, but is preferably laminated on the exterior of the battery sheath and only electrically connected to the positive and negative electrodes.

Figure 3:
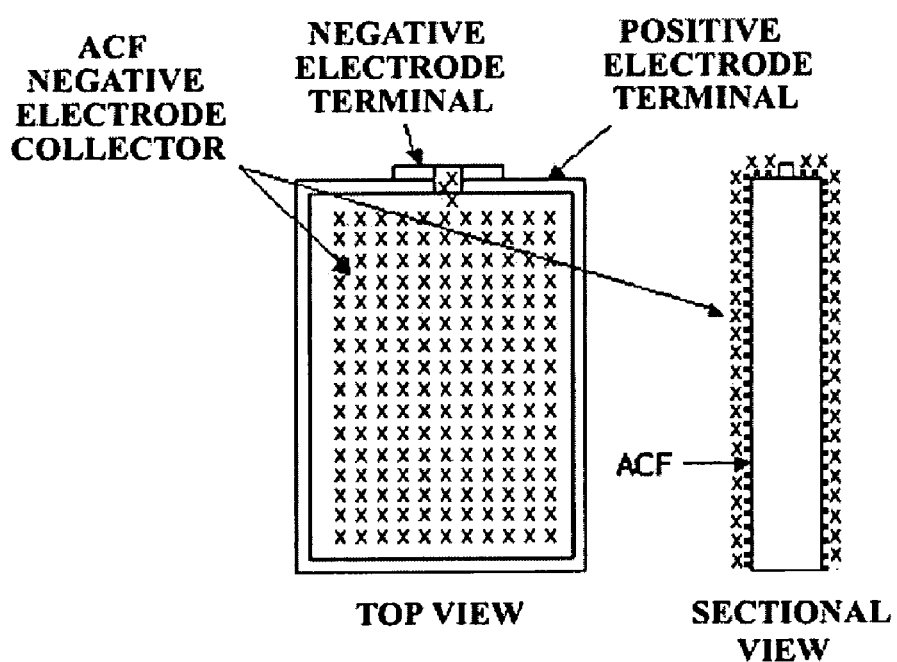
FIG. 3 is a diagrammatic view showing a metal can-type battery having an ACF safety device electrically connected thereto according to the present invention.

FIG. 3 shows a can-type battery having the inventive safety device connected thereto.

In general, a can-type battery has an electrode assembly including positive and negative electrode plates and a separator placed in a container including a can and a cap. The container acts as an electrode terminal (positive electrode terminal in FIG. 3) and an electrode terminal having the opposite polarity (negative electrode terminal in FIG. 3) protrudes from the container while being insulated.

The container of the can-type battery can act as the first metal plate of the inventive safety device. Therefore, the second metal plate of the inventive safety device is positioned parallel to at least one surface of the container with the ACF interposed between them and a part of the second metal plate is electrically connected to the electrode terminal having the opposite polarity.

The inventive safety device may be used for any type of battery, including a primary battery and a secondary battery, as long as it has been charged. As a non-limiting example, the inventive safety device may be used for a lithium secondary battery including a) a positive electrode capable of lithium ion intercalation/deintercalation, b) a negative electrode capable of lithium ion intercalation/deintercalation, c) a porous separator, and d) a non-aqueous electrolyte including lithium salt and electrolyte compound.

The non-aqueous electrolyte includes cyclic carbonate and/or linear carbonate. The cyclic carbonate may be, for example, ethylene carbonate (EC), propylene carbonate (PC), gamma-butyrolactone (GBL). The linear carbonate is, for example, preferably at least one selected from the group consisting of diethyl carbonate (DEC), dimethyl carbonate (DMC), ethylmethyl carbonate (EMC), and methyl propyl carbonate (MPC).

The lithium salt included in the non-aqueous electrolyte is preferably selected from the group consisting of $LiClO_4$, $LiCF_3SO_3$, $LiPF_6$, $LiBF_4$, $LiAsF_6$, and $LiN(CF_3SO_2)_2$.

As the negative electrode active material, carbon, lithium metal or alloy is preferably used. In addition, metal oxide capable of lithium ion intercalation/deintercalation and having a potential for lithium of less than 2V, such as $TiO_2$ or $SnO_2$, may also be used.

The positive electrode active material is preferably a lithium-containing transition metal oxide and, for example, is preferably at least one selected from the group consisting of $LiCoO_2$, $LiNiO_2$, $LiMn_2O_4$, $LiMnO_2$, and $LiNi_{1-x}Co_xO_2$ ($0<x<1$). A positive electrode made of metal oxide, such as $MnO_2$, or a composition thereof may also be used.

The porous separator may be, for example, a polyolefin-based separator.

The inventive lithium secondary battery may be manufactured by a conventional method of placing a porous separator between positive and negative electrodes and injecting a non-aqueous electrolyte including lithium salt, such as $LiPF_6$, and an additive.

EXAMPLES

The present invention will now be described in more detail with reference to the following examples, which are only given as an illustration of the present invention and do not limit the present invention.

Example 1

As shown in FIG. 2, the inventive safety device including a first metal plate (positive electrode collector), a second metal plate (negative electrode collector), and an ACF interposed between both metal plates was attached to a pouch-type cell in such a manner that the first and second electrode plates were electrically connected to the positive and negative electrodes, respectively. The positive and negative electrodes of the pouch-type cell were made of $LiCoO_2$ and carbon, respectively, and the electrolyte was made of 1M $LiPF_6$ solution having base composition of EC:EMC (1:2).

The cell was charged to 4.2V and local crush experiment was performed by compressing the inventive safety device in the vertical direction with a rod having a diameter of 1 cm at a speed of 3 mm/min.

Figure 4:
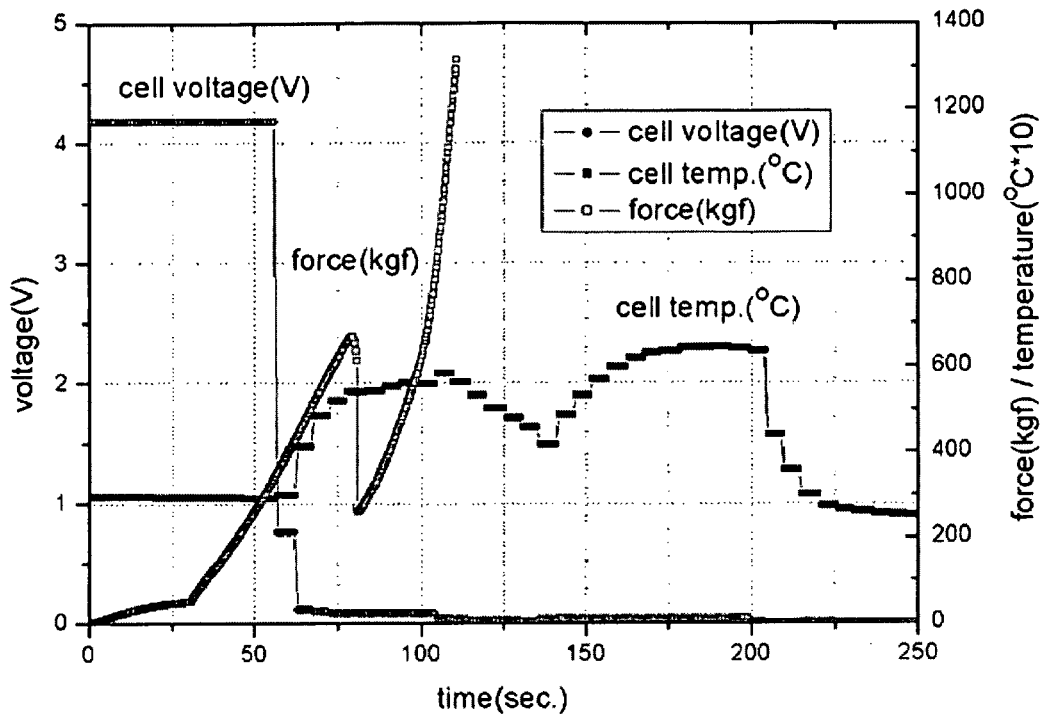
FIG. 4 is a graph showing the result of local crush experiment of a battery manufactured in Example 1.

The experiment result showed that, as the pressure applied to the ACF rose, the voltage abruptly dropped to about 0 V. The cell was stable without explosion and the exothermic temperature was very low, i.e., about 70° C. or lower (refer to FIG. 4).

Example 2

Cell manufacturing and local crush experiments were performed in the same manner as in Example 1, except that the cell was charged to 4.3V to run the experiment under a more severe condition than in Example 1.

Figure 5:
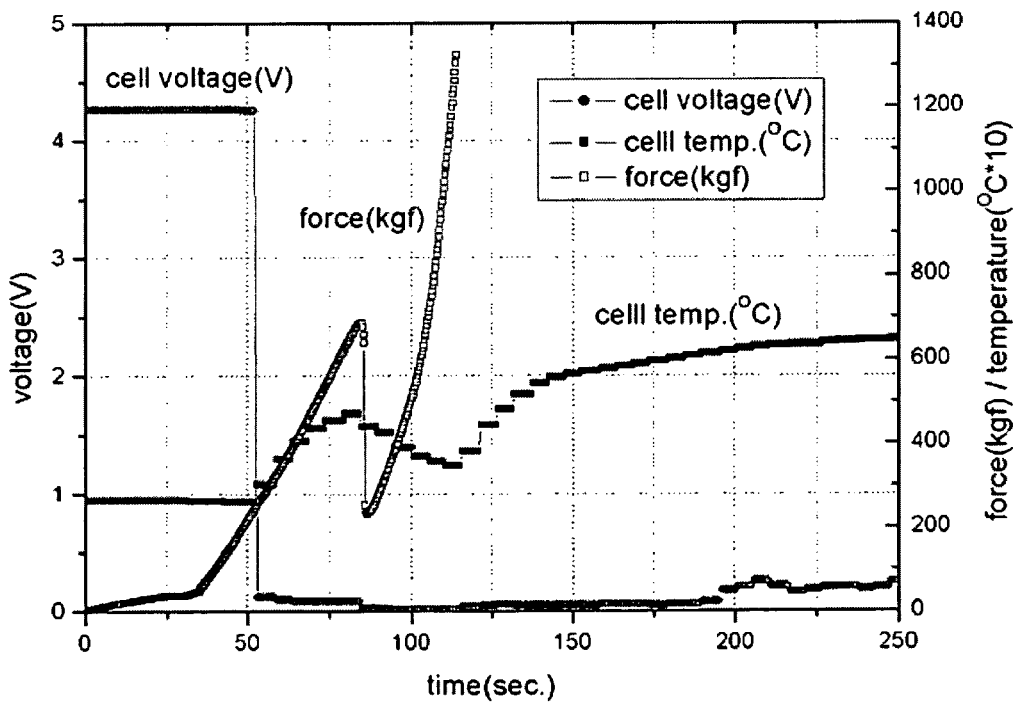
FIG. 5 is a graph showing the result of local crush experiment of a battery manufactured in Example 2.

The experiment result showed that, as the pressure rose, the voltage abruptly dropped to about 0 V. The cell was stable without explosion and the exothermic temperature was very low, i.e., about 70° C. or lower (refer to FIG. 5).

Example 3

Cell manufacturing and local crush experiments were performed in the same manner as in Example 1, except that the cell was charged to 4.4V to run the experiment under a more severe condition than in Example 2.

Figure 6:
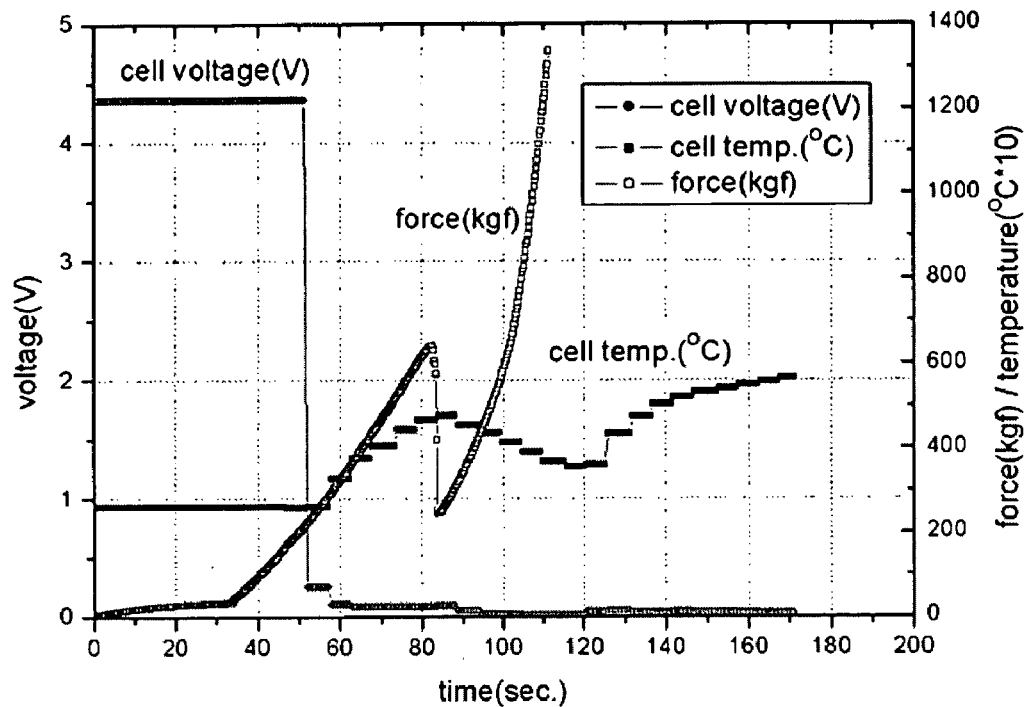
FIG. 6 is a graph showing the result of local crush experiment of a battery manufactured in Example 3.

The experiment result showed that, as the pressure rose, the voltage abruptly dropped to about 0 V. The cell was stable without explosion and the exothermic temperature was very low, i.e., about 70° C. or lower (refer to FIG. 6).

Comparative Example 1

Cell manufacturing and local crush experiments were performed in the same manner as in Example 1, except that the inventive safety device was not attached to the cell.

Figure 7:
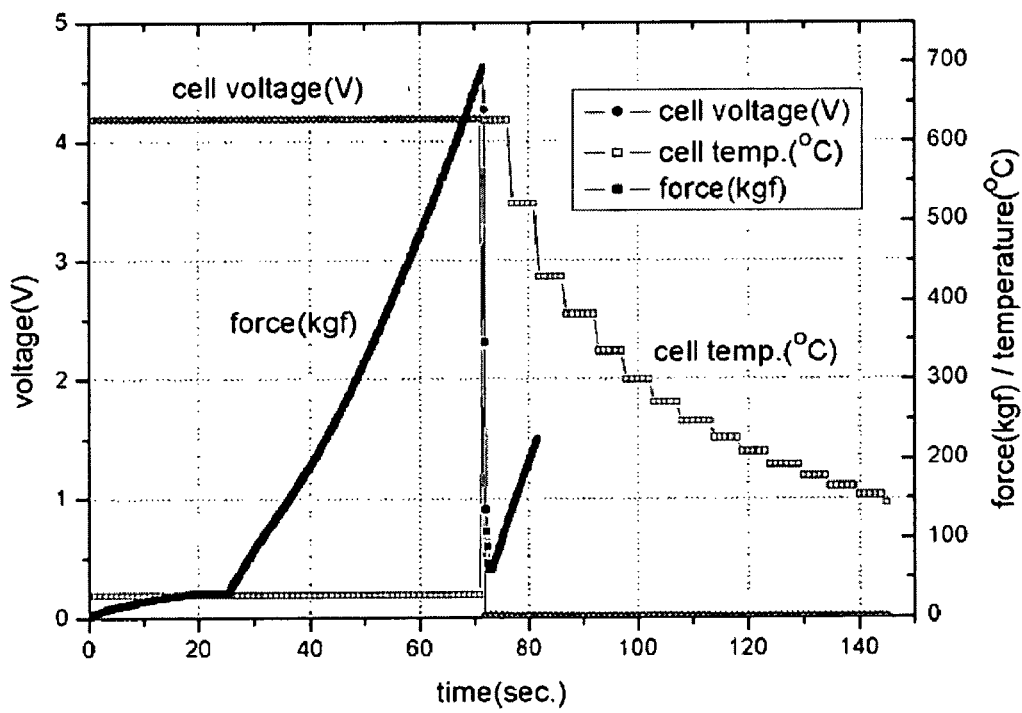
FIG. 7 is a graph showing the result of local crush experiment of a battery manufactured in Comparative example 1.

The experiment result showed that the cell exploded. Voltage drop did not occur before the explosion, but voltage drop and heat occurred concurrently with the explosion. The exothermic temperature was very high, i.e., about 600° C. or higher (refer to FIG. 7).

INDUSTRIAL APPLICABILITY

The inventive safety device is connected to a battery and prevents a cell from being damaged or at least from igniting or exploding, even when an external impact caused by a pressure, a nail, or a nipper or an external pressure is applied, by conducting the current of the cell to the safety device and discharging the battery before the cell is damaged by the cell.

Although there has been a limitation in increasing the energy density of a non-aqueous secondary battery (for example, lithium secondary battery) due to the safety problem of the battery, the inventive safety device can increase operating charging voltage of the battery while securing the stability thereof, thereby to realize a battery having high energy density.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A battery comprising:
    an electrode assembly; and
    a safety device on and positioned outside of the electrode assembly,
    wherein the safety device is adapted to form an electrical circuit when a predetermined pressure or higher is applied to both of the electrode assembly and the safety device and convert a state of charge of the electrode assembly to a discharged state,
    wherein the safety device has a first metal plate, a pressure-sensitive conducting film, and a second metal plate, which are in contact with each other, and
    wherein the safety device is adapted to discharge the electrode assembly within 60 seconds when a predetermined pressure or higher is applied to the safety device and the first and second metal plates are directly electrically connected in parallel to positive and negative electrodes of the electrode assembly, respectively.

2. The battery as claimed in claim 1, wherein the film is an anisotropic conductive film.

3. The battery as claimed in claim 1, wherein the safety device is positioned along a long side of the battery such that the safety device is positioned perpendicularly to a direction in which most pressure is applied to the battery in the case of an external impact.

4. The battery as claimed in claim 1, wherein the battery is a lithium secondary battery.

5. A safety device for a battery, comprising:
    a first metal plate;
    a pressure-sensitive conducting film; and
    a second metal plate,
    which are adapted to form an electrical circuit when a predetermined pressure or higher is applied to a battery and convert a state of charge of the battery to a discharged state, and
    wherein the first metal plate, the pressure-sensitive conducting film, and the second metal plate are adapted to discharge the battery within 60 seconds when a predetermined pressure or higher is applied to the first metal plate, the pressure-sensitive conducting film, and the second metal plate, and the first and second metal plates are to be directly electrically connected in parallel to a positive electrode and a negative electrode of the battery, respectively, and the safety device is on and positioned outside of the battery.

6. The safety device for a battery as claimed in claim 5, wherein the film is an anisotropic conductive film.

7. The safety device for a battery as claimed in claim 5, wherein the metal plates have thermal conductivity.

8. A method for adjusting the safety of a battery, comprising:

converting a state of charge a battery to a discharged state, before the battery is damaged by a pressure, through an electrical circuit formed on a safety device by means of the pressure, wherein the safety device has a first metal plate, a pressure-sensitive conducting film, and a second metal plate which are sequentially laminated and are in contact with each other, and wherein the safety device is adapted to discharge the battery within 60 seconds when a predetermined pressure or higher is applied to both of the battery and the safety device, and the first and second metal plates are directly electrically connected in parallel to a positive electrode and a negative electrode of the battery, respectively, and the safety device is on and positioned outside of the battery.

9. The battery as claimed in claim 1, wherein the safety device is adapted to discharge the electrode assembly within 25 seconds when a predetermined pressure or higher is applied to the safety device.

10. The battery as claimed in claim 1, wherein the safety device is adapted to reduce a voltage of the electrode assembly at a rate of equal to or greater than one volt per second when a predetermined pressure or higher is applied to the safety device.

11. The safety device of claim 5, wherein the first metal plate, the pressure-sensitive conducting film, and the second metal plate are adapted to discharge the battery within 25 seconds when a predetermined pressure or higher is applied to the first metal plate, the pressure-sensitive conducting film, and the second metal plate.

12. The safety device of claim 5, wherein the first metal plate, the pressure-sensitive conducting film, and the second metal plate are adapted reduce a voltage of the battery at a rate of equal to or greater than one volt per second when a predetermined pressure or higher is applied to the first metal plate, the pressure-sensitive conducting film, and the second metal plate.

13. The method of adjusting the safety of a battery of claim 8, wherein the safety device is adapted to discharge the battery within 25 seconds when a predetermined pressure or higher is applied to both of the battery and the safety device.

14. The method of adjusting the safety of a battery of claim 8, wherein the safety device is adapted to reduce a voltage of the battery at a rate of equal to or greater than one volt per second when a predetermined pressure or higher is applied to both of the battery and the safety device.

* * * * *